United States Patent
Chen et al.

(10) Patent No.: US 9,172,269 B2
(45) Date of Patent: Oct. 27, 2015

(54) DEVICE AND METHOD USING A KEYBOARD CONTROLLER AND VOLTAGE DETECTION CIRCUITRY FOR BATTERY CHARGING

(75) Inventors: Chien-Liang Chen, New Taipei (TW); Chun-Ta Lee, New Taipei (TW)

(73) Assignee: Wistron Corp., New Taipei (TW)

( * ) Notice: Subject to any disclaimer, the term of this patent is extended or adjusted under 35 U.S.C. 154(b) by 589 days.

(21) Appl. No.: 13/619,491

(22) Filed: Sep. 14, 2012

(65) Prior Publication Data
US 2013/0221902 A1 Aug. 29, 2013

(30) Foreign Application Priority Data

Feb. 24, 2012 (TW) .............................. 101106157 A

(51) Int. Cl.
*H02J 7/00* (2006.01)
*H02J 7/04* (2006.01)
*H02H 7/18* (2006.01)

(52) U.S. Cl.
CPC *H02J 7/045* (2013.01); *H02H 7/18* (2013.01); *H02J 7/00* (2013.01); *H02J 7/007* (2013.01); *H02J 7/0026* (2013.01); *H02J 7/0031* (2013.01); *H02J 7/0036* (2013.01); *H02J 7/0068* (2013.01);
(Continued)

(58) Field of Classification Search
CPC ......... H02J 7/00; H02J 7/0026; H02J 7/0031; H02J 7/0036; H02J 2007/0037; H02J 2007/0039; H02J 7/04; H02J 7/042; H02J 7/044; H02J 7/045; H02J 7/0068; H02J 7/007; H02J 7/0077

USPC .................. 320/128, 132, 134, 137, 162–163
See application file for complete search history.

(56) References Cited

U.S. PATENT DOCUMENTS

| 6,661,200 B2 * | 12/2003 | Odaohhara .................... 320/132 |
| 7,755,330 B2 * | 7/2010 | Formenti et al. .............. 320/164 |
| 7,768,290 B2 * | 8/2010 | Zhang et al. ............. 324/762.09 |

(Continued)

FOREIGN PATENT DOCUMENTS

| CN | 201419294 Y | 3/2010 |
| CN | 201601535 U | 10/2010 |

(Continued)

OTHER PUBLICATIONS

Taiwan Patent Office, Office Action, Patent Application Serial No. 101106157, Dec. 27, 2013, Taiwan.

(Continued)

*Primary Examiner* — Stacy Whitmore

(57) ABSTRACT

A charging device including a charging circuit, a voltage detection circuit, and a keyboard controller is provided. The charging circuit receives a charging power source, and produces a battery-charging power source at a first node by the charging power source to charge a battery. The voltage detection circuit detects a voltage at the first node, and produces a voltage detection result. The keyboard controller determines whether the voltage at the first node is less than a predetermined voltage according to the voltage detection result, and determines whether a predetermined condition has been satisfied, wherein the predetermined condition includes the voltage at the first node being less than the predetermined voltage, and the keyboard controller is arranged to force the charging circuit to stop producing the battery-charging power source at the first node when the predetermined condition has been satisfied.

18 Claims, 6 Drawing Sheets

(52) U.S. Cl.
CPC  *H02J 7/0077* (2013.01); *H02J 7/04* (2013.01); *H02J 7/042* (2013.01); *H02J 7/044* (2013.01)

(56) References Cited

U.S. PATENT DOCUMENTS

| | | | | |
|---|---|---|---|---|
| 8,610,397 | B2* | 12/2013 | Purdy et al. | 320/106 |
| 2002/0113575 | A1* | 8/2002 | Lee | 320/132 |
| 2002/0167294 | A1* | 11/2002 | Odaohhara | 320/132 |
| 2008/0238358 | A1* | 10/2008 | Koide et al. | 320/106 |
| 2009/0108810 | A1* | 4/2009 | Sawyers | 320/137 |
| 2009/0267589 | A1* | 10/2009 | Zhang et al. | 324/123 R |
| 2011/0095729 | A1* | 4/2011 | Tsuji et al. | 320/162 |
| 2011/0121653 | A1* | 5/2011 | Hartular et al. | 307/66 |
| 2011/0249476 | A1* | 10/2011 | Chen et al. | 363/52 |
| 2011/0316954 | A1* | 12/2011 | Komatsu | 347/171 |
| 2012/0256597 | A1* | 10/2012 | Miyamoto | 320/137 |
| 2013/0221902 | A1* | 8/2013 | Chen et al. | 320/107 |

FOREIGN PATENT DOCUMENTS

| | | |
|---|---|---|
| TW | 443655 U | 6/2001 |
| TW | 200427174 | 12/2004 |
| TW | 200931753 | 7/2009 |
| TW | 201018048 | 5/2010 |

OTHER PUBLICATIONS

China Patent Office, Office Action, Patent Application Serial No. 201210065953.7, Aug. 29, 2014, China.
Taiwan Patent Office, Office Action, Patent Application Serial No. 101106157, Jul. 11, 2014, Taiwan.
Taiwan Patent Office, Office Action, Patent Application U.S. Appl. No. 101106157, Dec. 27, 2013, Taiwan.
China Patent Office, Office Action, Patent Application U.S. Appl. No. 201210065953.7, Aug. 29, 2014, China.

* cited by examiner

DEVICE AND METHOD USING A KEYBOARD CONTROLLER AND VOLTAGE DETECTION CIRCUITRY FOR BATTERY CHARGING

CROSS REFERENCE TO RELATED APPLICATIONS

This application claims priority of Taiwan Patent Application No. 101106157, filed on Feb. 24, 2012, the entirety of which is incorporated by reference herein.

BACKGROUND OF THE INVENTION

1. Field of the Invention

The present invention relates to a charging device, and in particular relates to a charging device used for detecting whether a short circuit exists between a battery and the charging device.

2. Description of the Related Art

With the progress of the electronic industry, batteries have been broadly applied to all kinds of things, such as mobile phones, digital cameras, laptops, and even electric vehicles. Therefore, demand for batteries constantly increase. When pursuing improved battery performance, there is an increased concern for battery safety.

A typical battery comprises electrodes, an electrolyte, and a separator. Ions formed at the electrodes are transported in the electrolyte to form a current, such that chemical energy is transformed to electric energy. A lithium-ion battery having high energy density is one type of main power source for mobile electric devices, such as notebooks, tablets, and mobile phones. However, when the energy density of the battery increases, the power and size of the battery may also increase, such that a great amount of heat is produced. Without an effective way to dissipate the heat, temperature of the battery may increase, resulting in an explosion of the electrolyte. Therefore, the safety of the battery is an important concern. Moreover, a battery and adaptor will be damaged when a short circuit between the battery and adaptor occur.

Thus, implementation of a charging protection circuit is important for lithium-ion batteries. Also, a circuit design preventing a short circuit from occurring between the battery and the charging device to protect a user is also important.

BRIEF SUMMARY OF THE INVENTION

A detailed description is given in the following embodiments with reference to the accompanying drawings.

The present invention discloses a charging device including a charging circuit, a voltage detection circuit, and a keyboard controller. The charging circuit is arranged to receive a charging power source, and produce a battery-charging power source at a first node by the charging power source to charge a battery. The voltage detection circuit is arranged to detect a voltage at the first node, and produce a voltage detection result accordingly. The keyboard controller is arranged to determine whether the voltage at the first node is lower than a predetermined voltage according to the voltage detection result, and determine whether a predetermined condition has been satisfied, wherein the predetermined condition includes the voltage at the first node being lower than the predetermined voltage, and the keyboard controller is arranged to force the charging circuit to stop producing the battery-charging power source at the first node when the predetermined condition has been satisfied.

The present invention further discloses a charging method applied to a charging device used to charge a battery. The charging method includes receiving a charging power source; producing a battery-charging power source at a first node by the charging power source to charge the battery; detecting a voltage at the first node when receiving the charging power source, and producing a voltage detection result accordingly; determining whether the voltage at the first node is lower than a predetermined voltage according to the voltage detection result; determining whether a predetermined condition has been satisfied; and forcing the charging circuit to stop producing the battery-charging power source at the first node when the predetermined condition has been satisfied, wherein the predetermined condition includes the voltage of the first node being lower than a predetermined voltage.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
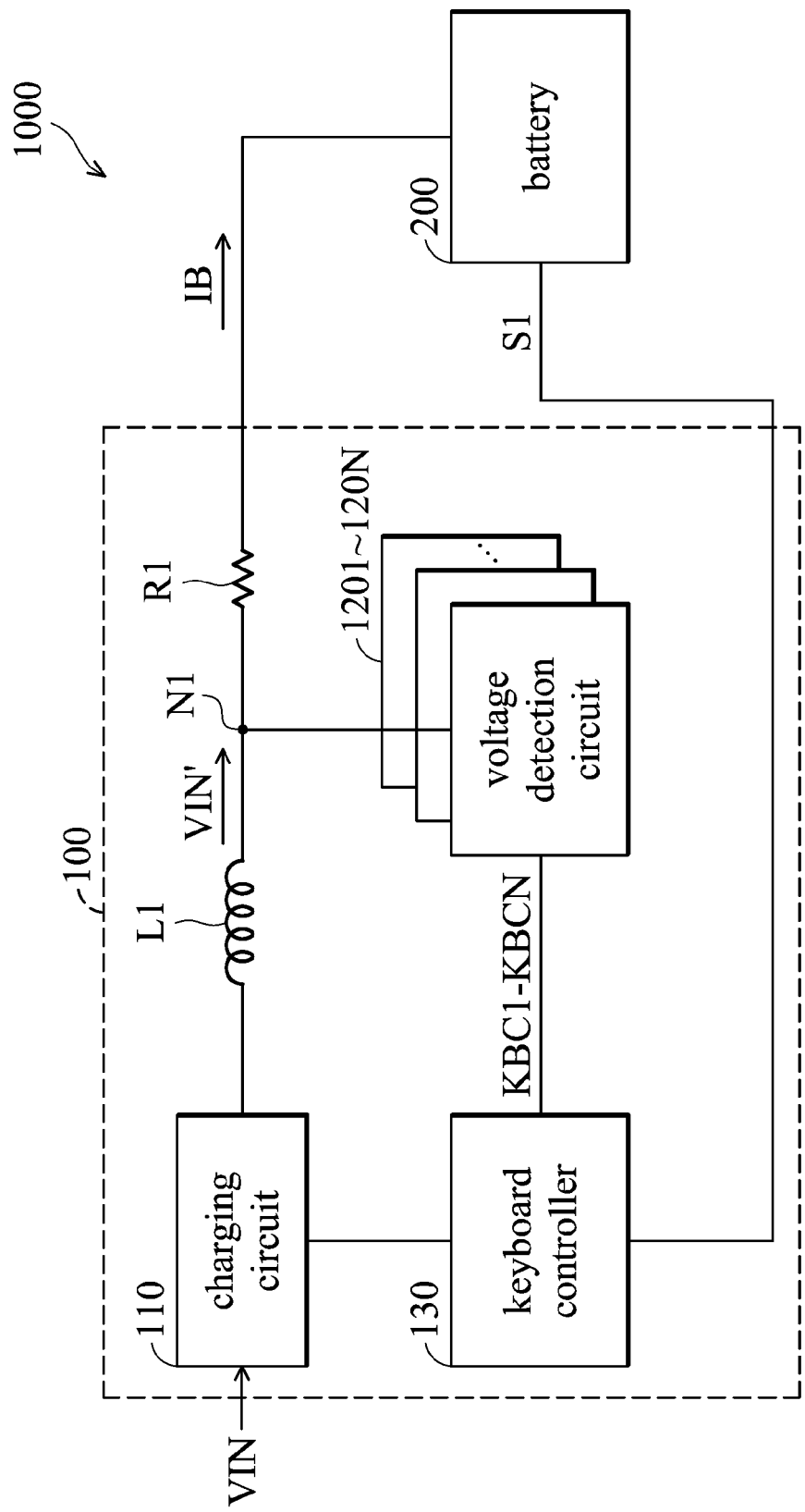
FIG. 1 is a schematic diagram illustrating an embodiment of a charging system of the present invention.

FIG. 1 is a schematic diagram illustrating an embodiment of a charging system of the present invention. The charging system 1000 includes a charging device 100 and a battery 200, wherein the charging device 100 is arranged to charge the battery 200.

The charging device 100 includes an inductor L1, a sensing resistor R1, a charging circuit 110, at least one voltage detection circuit(s) 1201-120N, and a keyboard controller (KBC) 130. It should be noted that the battery 200 can be constituted by serial or parallel battery cells with different voltages. The charging device 100 is arranged to determine whether a predetermined condition has been satisfied according to a result detected by at least one selected voltage detection circuit of the voltage detection circuit 1201-120N, wherein the at least one selected voltage detection circuit is selected according to the rated voltage of the battery 200. The charging device 100 is further arranged to stop charging the battery 200 to protect the charging device 100 and the battery 200 when the predetermined condition has been satisfied.

The inductor L1 has a first terminal coupled to the charging circuit 110 and a second terminal coupled to a node N1, wherein the inductor L1 is arranged to rectify a charging power source VIN received by the charging circuit 110. The sensing resistor R1 has a first terminal coupled to the node N1, and a second terminal coupled to the battery 200, wherein the sensing resistor R1 is arranged to detect a charging current IB flowing through the battery 200. It should be noted that the charging device 100 of this embodiment further includes a system management bus (SMBus) coupled between the keyboard controller 130 and the battery 200, wherein a determine signal S1 of the system management bus corresponds to the charging current IB flowing through the battery 200, and the keyboard controller 130 is arranged to receive the determine signal S1 which indicates the charging current IB. The charging circuit 110 is arranged to receive a charging power source VIN. Moreover, the charging circuit 110 is further arranged to adjust and control the charging power source VIN according to the command(s) of the keyboard controller 130 to produce a battery-charging power source VIN' at the node N1 by the charging power source VIN to charge the battery 200. The voltage detection circuit(s) 1201-120N is/are arranged to detect the voltage at the node N1, and produce at least one voltage detection result(s) KBC1-KBCN, respectively. The keyboard controller 130 is arranged to determine whether the voltage at the node N1 is lower than a predetermined voltage according to one of the voltage detection results KBC1-KBCN, and determine whether a predetermined condition has been satisfied. In some embodiment, the voltage at the node N1 can be the charging power source VIN, but it is not limited thereto. It should be noted that the battery-charging power source VIN' at the node N1 will be transmitted to other elements rather than the battery 200 when a short circuit exists between the charging device 100 and the battery 200. Namely, the battery-charging power source VIN' at the node N1 will be transmitted to other elements rather than the battery 200 when a short circuit exists at the node N1. Therefore, the voltage at the node N1 will be lower than the predetermined voltage. Therefore, the predetermined condition further includes the voltage at the node N1 being lower than the predetermined voltage. When the predetermined condition has been satisfied, the keyboard controller 130 is arranged to force the charging circuit 110 to stop producing the battery-charging power source VIN' at the node N1, such that the battery 200 is stopped to be charged.

In another embodiment of the invention, the keyboard controller 130 is further arranged to determine whether the charging device 100 is in a charging environment and whether an adapter (not shown) used for providing the charging power source VIN is overloaded, when the voltage at the node N1 is lower than the predetermined voltage. Moreover, the keyboard controller 130 is arranged to determine whether the charging device 100 is in the charging environment according to whether the adapter used for providing the charging power source VIN and the battery 200 are connected to the charging device 100, and whether a signal of the battery 200 is normal and indicating that the battery 200 needs to be charged. For example, each of the two connectors, which are used for connecting to the battery 200 and the adapter to the charging device 100, has a sensing device to transmit a sensing signal to the keyboard controller 130 when the adapter and/or the battery 200 is/are connected to the charging device 100, respectively. For example, the connectors can be plugs and/or sockets. Moreover, the keyboard controller 130 can determine whether the adapter and the battery 200 are connected to the charging device 100 according to whether the pins used for connecting to the adapter and the battery 200 have received the signal or not. Furthermore, a plurality of signal lines (not shown) are connected between the keyboard controller 130 and the battery 200, such as the signal line which is used for identifying the model of the battery 200, the rated voltage of the battery 200, and/or the temperature of the battery 200, etc. Therefore, the keyboard controller 130 can determine whether the signal of the battery 200 is normal according to the signals on the signal lines. In the present embodiment, the predetermined condition includes the voltage of the node N1 being lower than the predetermined voltage, the charging device 100 being in the charging environment, and the adapter not being overloaded. Furthermore, when the voltage of the node N1 is lower than the predetermined voltage, the adapter and the battery 200 are both connected to the charging device 100, the signal of the battery 200 is normal and indicating that the battery 200 needs to be charged, and the adapter is not overloaded, the keyboard controller 130 forces the charging circuit 110 to stop producing the battery-charging power source VIN' at the node N1 to stop charging the battery 200. Namely, when the predetermined condition has been satisfied, the keyboard controller 130 forces the charging circuit 110 to stop producing the battery-charging power source VIN' at the node N1 to stop charging the battery 200.

In another embodiment, the keyboard controller 130 is further arranged to determine whether the charging current IB flowing to the battery 200 from the node N1 is less than a predetermined current value, when receiving the charging power source VIN. In the present embodiment, the predetermined condition includes the voltage at the node N1 being lower than the predetermined voltage, and the charging current IB is less than the predetermined current value. Furthermore, when the voltage at the node N1 is lower than the predetermined voltage and the charging current IB is less than the predetermined current value, the keyboard controller 130 forces the charging circuit 110 to stop producing the battery-charging power source VIN' at the node N1 to stop charging the battery 200. Namely, when the predetermined condition has been satisfied, the keyboard controller 130 forces the charging circuit 110 to stop producing the battery-charging power source VIN' at the node N1 to stop charging the battery 200. It should be noted that, in the present embodiment, the keyboard controller 130 is arranged to determine whether the charging current IB is less than the predetermined current value according to the determine signal S1 of the system management bus. In another embodiment of the invention, the keyboard controller 130 is arranged to determine whether the charging current IB is less than the predetermined current value according to the charging current IB flowing through the sensing resistor R1, but it is not limited thereto.

In another embodiment of the invention, the keyboard controller 130 is further arranged to determine whether the charging device 100 is in a charging environment and whether the adapter used for providing the charging power source VIN is overloaded, when the voltage at the node N1 is lower than the predetermined voltage and the charging current IB is less than the predetermined current value. In the present embodiment, the predetermined condition includes the voltage at the node N1 being lower than the predetermined voltage, the charging current IB being less than the predetermined current value, the charging device 100 being in the charging environment, and the adapter not being overloaded. Furthermore, when the voltage at the node N1 is lower than the predetermined voltage, the charging current IB is less than the predetermined current value, both of the adapter and the battery 200 are connected to the charging device 100, the signal of the battery 200 is normal and indicating that the battery 200 needs to be charged, and the adapter is not overloaded, the keyboard controller 130 forces the charging circuit 110 to stop producing the battery-charging power source VIN' at the node N1 to stop charging the battery 200. Namely, when the predetermined condition has been satisfied, the keyboard controller 130 forces the charging circuit 110 to stop producing the battery-charging power source VIN' at the node N1 to stop charging the battery 200.

Figure 2:
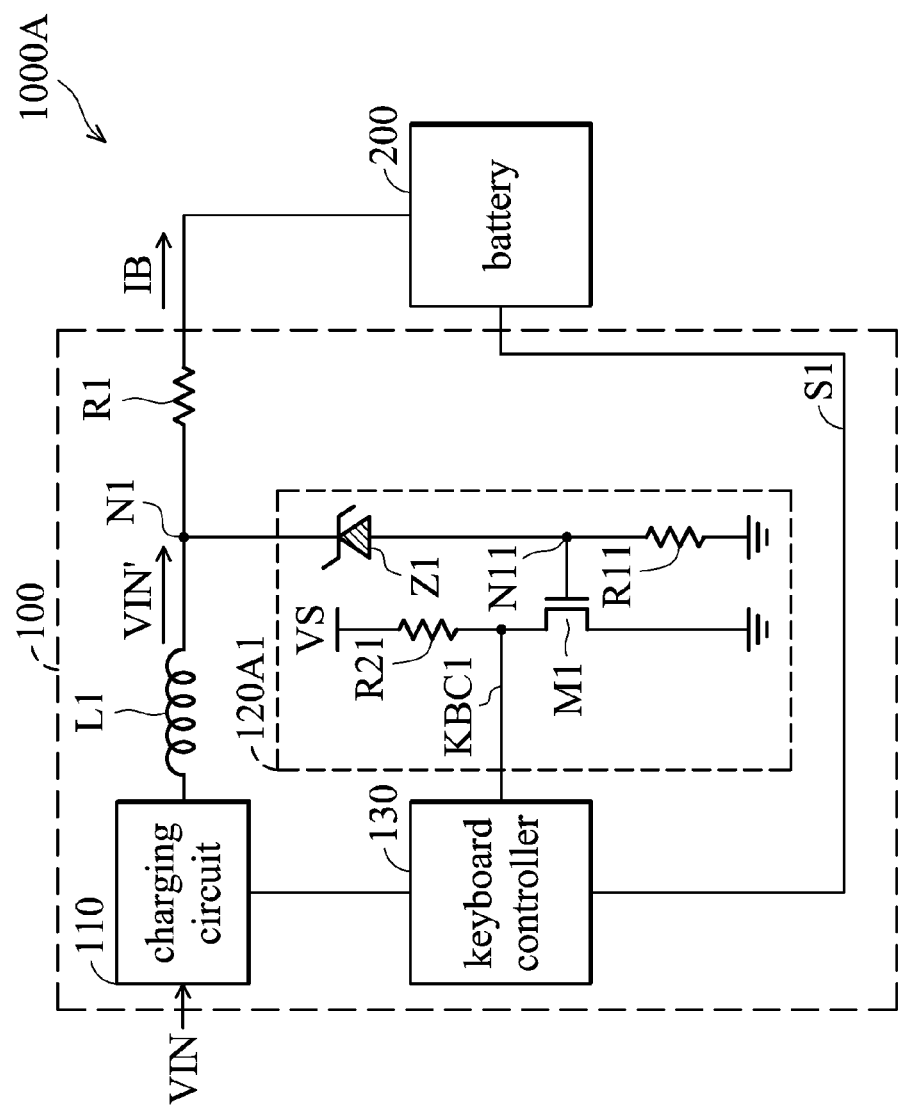
FIG. 2 is a schematic diagram illustrating an embodiment of the charging system of FIG. 1.

FIG. 2 is a schematic diagram illustrating an embodiment of the charging system of FIG. 1. The charging system 1000A includes a charging device 100 arranged to charge the battery 200. The charging device 100 includes an inductor L1, a sensing resistor R1, a voltage detection circuit 120A1, a charging circuit 110, and a keyboard controller 130. It should be noted that reference may be made to FIG. 1 for the detailed descriptions of the inductor L1, the sensing resistor R1, the charging circuit 110, and the keyboard controller 130.

The voltage detection circuit 120A1 includes a zener diode Z1, a resistor R11, a switching transistor M1, and a resistor R21. The zener diode Z1 has a cathode coupled to the node N1, and an anode coupled to a node N11, wherein the zener diode Z1 is arranged to be turned on when the voltage at the node N1 is higher than the predetermined voltage and turned off when the voltage at the node N1 is lower than the predetermined voltage. The resistor R11 has a first terminal coupled to the node N11 and a second terminal coupled to a ground, wherein the resistor R11 is arranged to produce a high level voltage when the zener diode Z1 is turned on, and produces a low level voltage when the zener diode Z1 is turned off. The switching transistor M1 has a control terminal coupled to the node N11, a drain terminal coupled to the keyboard controller 130 and a source terminal coupled to the ground, wherein the switching transistor M1 is arranged to be switched according to the voltage at the node N11. The resistor R21 has a first terminal coupled to a voltage source VS and a second terminal coupled to the drain terminal of the switching transistor M1, wherein the resistor R21 is arranged to provide a high level signal via the voltage source VS to the keyboard controller 130 when the switching transistor M1 is turned off. It should be noted that, in the present embodiment, the keyboard controller 130 is arranged to determine whether the voltage at the node N1 is lower than the predetermined voltage according to the signal of the drain terminal of the switching transistor M1.

When the voltage at the node N1 is lower than the predetermined voltage, the zener diode Z1 is turned off, such that a low level voltage is produced at the node N11 and the switching transistor M1 is turned off. Namely, when a short circuit between the charging device 100 and the battery 200 occurs, the zener diode Z1 is turned off, such that a low level voltage is produced at the node N11 and the switching transistor M1 is turned off. A high level signal is produced at the second terminal of the resistor R21 and provided to the keyboard controller 130 due to the switching transistor M1 being turned off. Moreover, a the high level voltage is produced at the node N11 and switching transistor M1 is conductive due to the conduction of the zener diode Z1, when the voltage of the node N1 is higher than the predetermined voltage. A low level signal is produced at the second terminal of the resistor R21 and provided to the keyboard controller 130 due to the conduction of the switching transistor M1. It should be noted that the keyboard controller 130 is arranged to determine that the voltage at the node N1 is lower than the predetermined voltage when the keyboard controller 130 receives the voltage detection result KBC1 corresponding to the high level.

Figure 3:
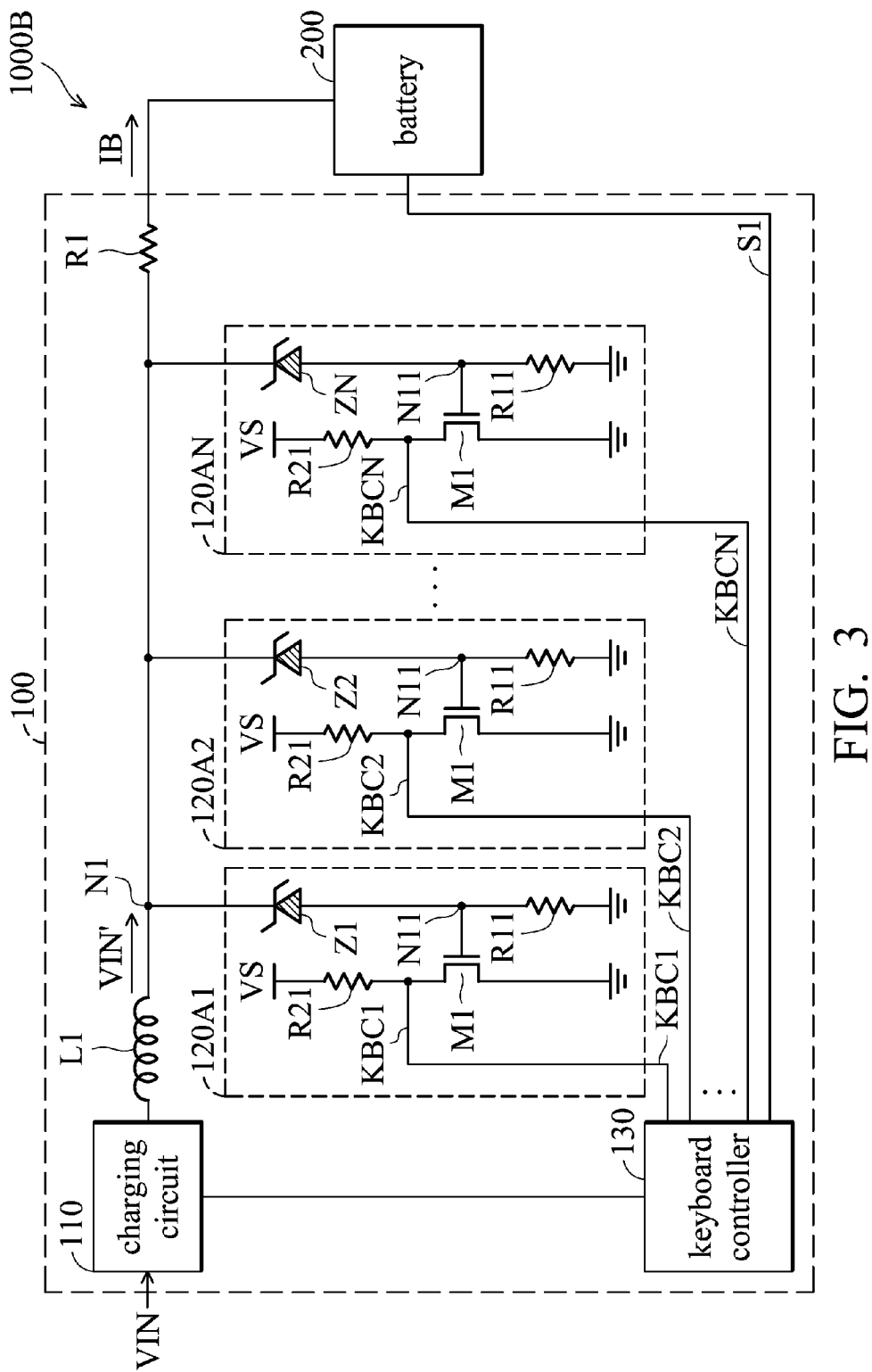
FIG. 3 is a schematic diagram illustrating another embodiment of the charging system of FIG. 1.

FIG. 3 is a schematic diagram illustrating another embodiment of the charging system of FIG. 1. The charging system 1000B includes a charging device 100 arranged to charge the battery 200. The charging system 1000B includes an inductor L1, a sensing resistor R1, a plurality of voltage detection circuits 120A1-120AN, a charging circuit 110, and a keyboard controller 130. It should be noted that FIG. 3 is similar to FIG. 2 except that FIG. 2 only has one voltage detection circuit 120A1, and FIG. 3 has a plurality of voltage detection circuits 120A1-120AN. The plurality of voltage detection circuits 120A1-120AN are arranged to produce different voltage detection results KBC1-KBCN. Furthermore, the zener diodes Z1-ZN of the voltage detection circuits 120A1-120AN are designed according to the different voltages of the battery 200, but it is not limited thereto. For example, higher detected voltages of the battery 200 require higher conducted voltages of the zener diode. Reference may be made to FIG. 1 for the detailed descriptions of the inductor L1, the sensing resistor R1, the charging circuit 110, and a keyboard controller 130.

The charging device 100 is arranged to select the result(s) detected by at least one of the voltage detection circuits 120A1-120AN according to the rated voltage of the battery 200, and determine whether the predetermined condition has been satisfied according to the selected result(s). Furthermore, the charging device 100 is further arranged to stop charging the battery 200 to protect the charging device 100 and the battery 200 when the predetermined condition has been satisfied. For example, the keyboard controller 130 is arranged to receive the information corresponding to the rated voltage of the battery 200 by the system management bus between the keyboard controller 130 and the battery 200. The rated voltage of the battery 200 can be 9 volts or 12 volts, but it is not limited thereto. In another embodiment of the invention, the keyboard controller 130 is arranged to receive the information corresponding to the rated voltage of the battery 200 by an external circuit (not shown), but it is not limited thereto. The keyboard controller 130 is arranged to determine that the voltage at the node N1 is lower than the predetermined voltage when the voltage detection result produced by the selected voltage detection circuit corresponds to the high level rated voltage.

Figure 4:
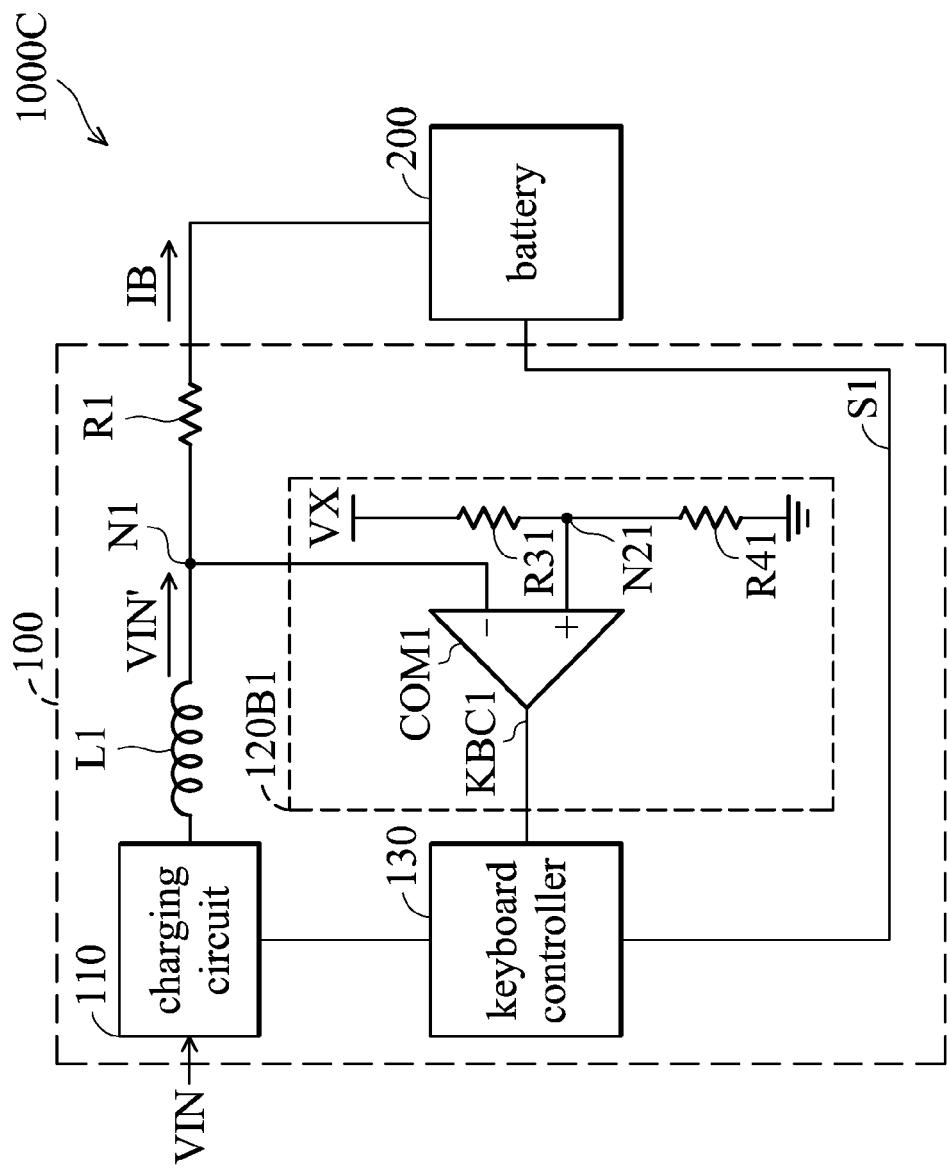
FIG. 4 is a schematic diagram illustrating another embodiment of the charging system of FIG. 1.

FIG. 4 is a schematic diagram illustrating another embodiment of the charging system of FIG. 1. The charging system 1000C includes a charging device 100 arranged to charge the battery 200. The charging system 1000C includes an inductor L1, a sensing resistor R1, a voltage detection circuit 120B1, a charging circuit 110, and a keyboard controller 130. Reference may be made to FIG. 1 for the detailed descriptions of the inductor L1, the sensing resistor R1, the charging circuit 110, and the keyboard controller 130.

The voltage detection circuit 120B1 includes a resistor R31, a resistor R41, and a comparator COM1. The resistor R31 has a first terminal coupled to a voltage source VX, and a second terminal coupled to a node N21. The resistor R41 has a first terminal coupled to the node N21, and a second terminal coupled to the ground. The resistor R31 and the resistor R41 are arranged to divide the voltage source VX to produce a predetermined voltage at the node N21. The comparator COM1 has a first input terminal coupled to the node N1, a second input terminal coupled to the node N21, and an output terminal arranged to produce a compare signal to serve as the voltage detection result KBC1, wherein the compare signal (voltage detection result KBC1) is provided to the keyboard controller 130. Namely, the voltage detection result KBC1 is provided to the keyboard controller 130. The keyboard controller 130 is arranged to determine whether the voltage at the node N1 is lower than the predetermined voltage according to the compare signal.

Figure 5:
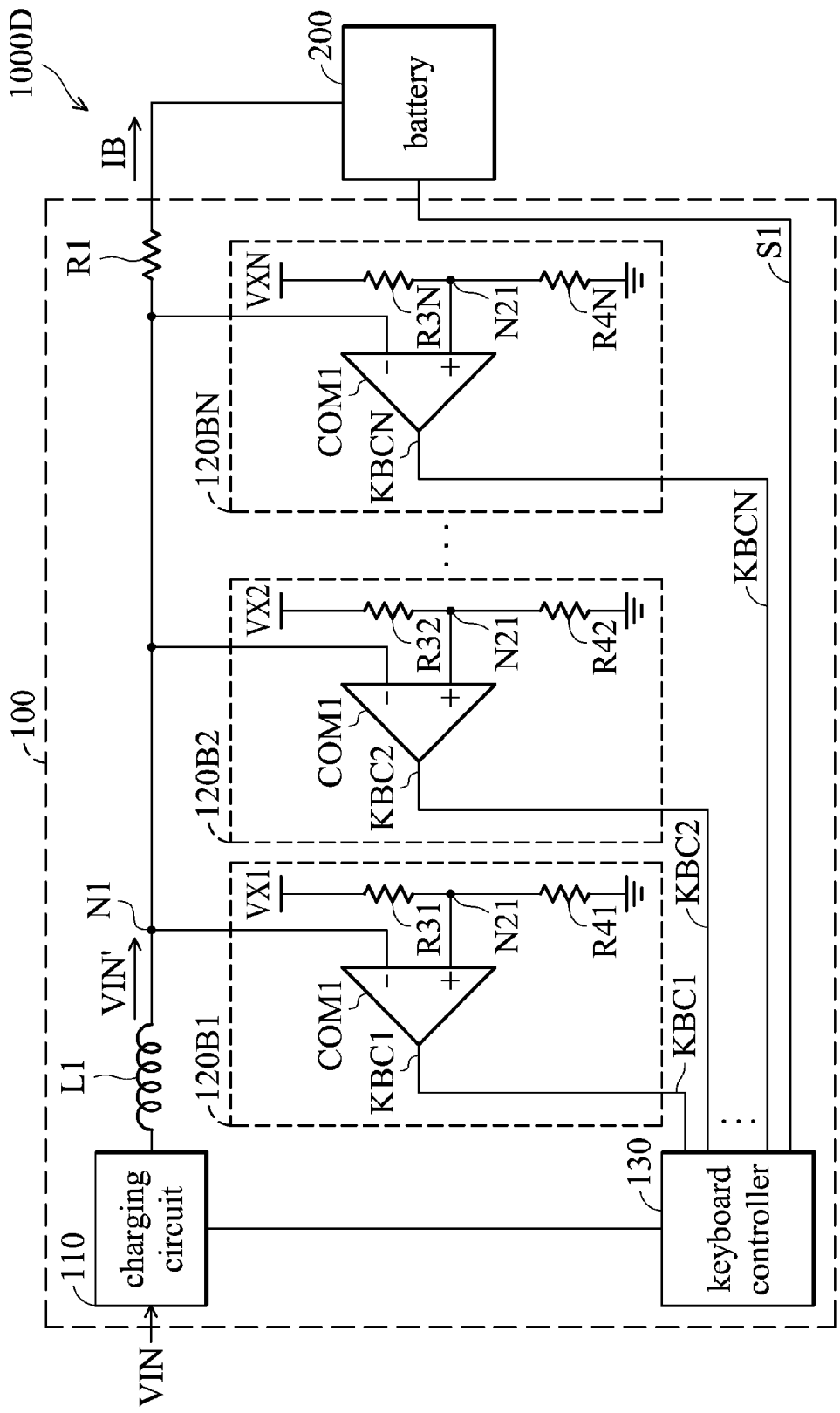
FIG. 5 is a schematic diagram illustrating another embodiment of the charging system of FIG. 1.

FIG. 5 is a schematic diagram illustrating another embodiment of the charging system of FIG. 1. The charging system 1000D includes a charging device 100 arranged to charge the battery 200. The charging system 1000 includes an inductor L1, a sensing resistor R1, a plurality of voltage detection circuits 120B1-120BN, a charging circuit 110, and a keyboard controller 130. It should be noted that FIG. 5 is similar to FIG. 4 except that FIG. 4 only has one voltage detection circuit 120B1, and FIG. 5 has a plurality of voltage detection circuits 120B1-120BN. The plurality of voltage detection circuits 120B1-120BN are arranged to produce different voltage detection results KBC1-KBCN. Furthermore, the voltage sources VX1-VXN, the resistors R31-R3N, and the resistors R41-R4N are designed according to the different voltages of the battery 200, but it is not limited thereto. For example, higher detected voltages of the battery 200 require higher divided voltages which are divided by the resistor R31 and resistor R4 at the node N21.

The charging device 100 is arranged to select the result(s) detected by at least one of the voltage detection circuits 120B1-120BN according to the rated voltage of the battery 200, and determine whether the predetermined condition has been satisfied according to the selected result(s). Furthermore, the charging device 100 is further arranged to stop charging the battery 200 to protect the charging device 100 and the battery 200, when the predetermined condition has been satisfied. For example, the keyboard controller 130 is arranged to receive the information corresponding to the rated voltage of the battery 200 by the system management bus between the keyboard controller 130 and the battery 200. For example, the rated voltage of the battery 200 can be 9 volts or 12 volts, but it is not limited thereto. In another embodiment of the invention, the keyboard controller 130 is arranged to receive the information corresponding to the rated voltage of the battery 200 by an external circuit (not shown), but it is not limited thereto. According to the rated voltage, the keyboard controller 130 selects the compare signal produced by the selected voltage detection circuit corresponding to the rated voltage. Namely, according to the rated voltage, the keyboard controller 130 selects the voltage detection result produced by the selected voltage detection circuit corresponding to the rated voltage. The keyboard controller 130 is arranged to determine that the voltage at the node N1 is lower than the predetermined voltage when the compare signal produced by the selected voltage detection circuit indicates that the voltage at the node N1 is lower than the predetermined voltage at the node N21. Namely, the keyboard controller 130 is arranged to determine that the voltage at the node N1 is lower than the predetermined voltage when the voltage detection result produced by the selected voltage detection circuit indicates that the voltage at the node N1 is lower than the predetermined voltage at the node N21. Reference to FIG. 1 may be made for the detailed descriptions of the inductor L1, the sensing resistor R1, the charging circuit 110, and the keyboard controller 130.

Figure 6:
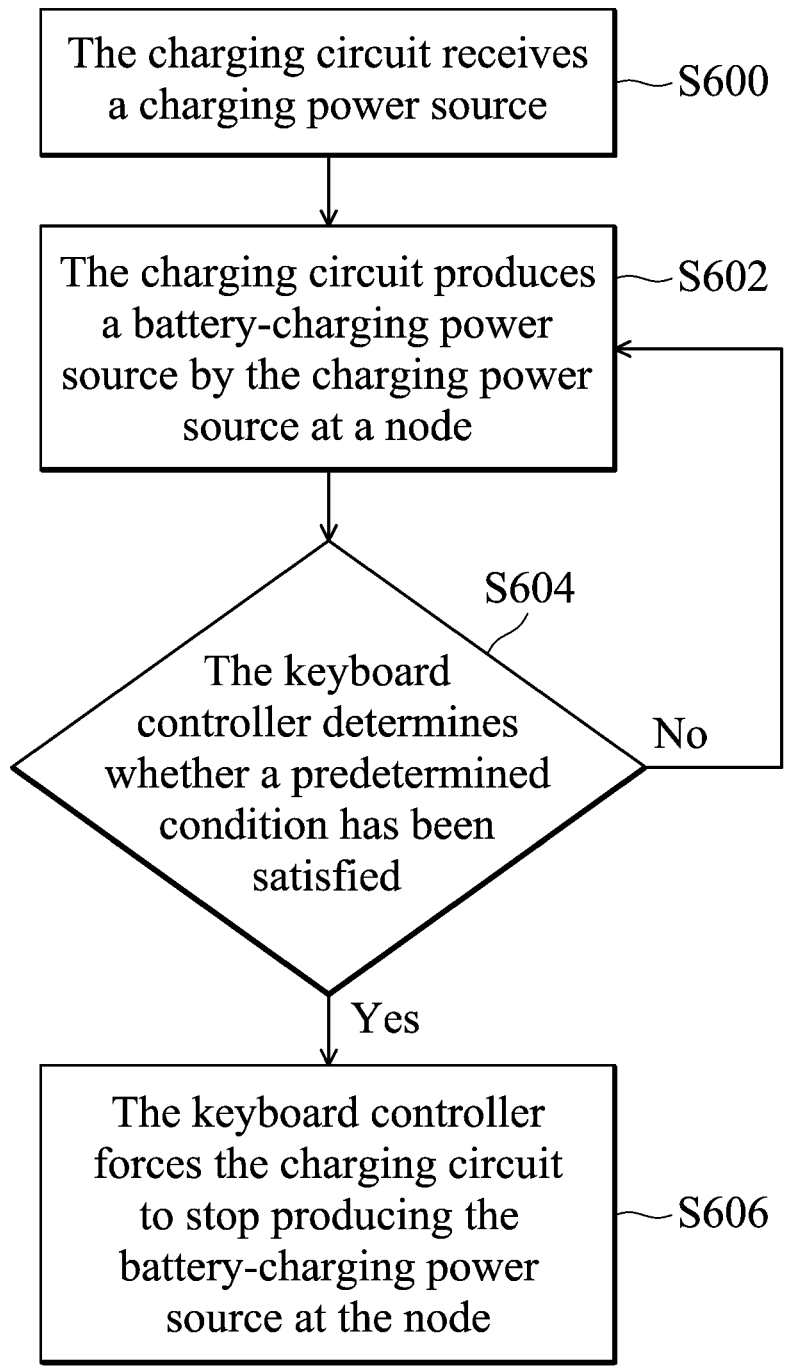
FIG. 6 is a flowchart of a charging method according to an embodiment of the present invention.

FIG. 6 is a flowchart of a charging method according to an embodiment of the present invention. The charging method is applied to the charging device 100 which is arranged to charge the battery 200. The process starts at the step S600.

In step S600, the charging circuit 110 is arranged to receive a charging power source VIN.

Next, in step S602, the charging circuit 110 is arranged to produce a battery-charging power source VIN' by the charging power source VIN at a node N1 to charge the battery 200.

Next, in step S604, the keyboard controller 130 is arranged to determine whether a predetermined condition has been satisfied. The process moves to step S606 when the predetermined condition has been satisfied. The process moves back to step S602 when the predetermined condition has not been satisfied.

In one embodiment of the invention, the voltage detection circuit(s) 1201-120N is/are arranged to detect the voltage at the node N1 when receiving the charging power source VIN, and produce at least one voltage detection result(s) KBC1-KBCN, respectively. The keyboard controller 130 is arranged to determine whether the voltage at the node N1 is lower than the predetermined voltage according to the voltage detection result KBC1-KBCN. The keyboard controller 130 determines that the predetermined condition has been satisfied when the voltage at the node N1 is lower than the predetermined voltage.

In another embodiment of the invention, when the voltage at the node N1 is lower than the predetermined voltage, the keyboard controller 130 is arranged to determine whether the charging device 100 is in a charging environment and whether the adapter used for providing the charging power source VIN is overloaded. The keyboard controller 130 is arranged to determine whether the charging device 100 is in the charging environment according to whether the adapter used for providing the charging power source VIN and the battery 200 are connected to the charging device 100, and whether a signal of the battery 200 is normal and indicating that the battery 200 needs to be charged. In the present embodiment, the predetermined condition includes the voltage at the node N1 being lower than the predetermined voltage, the charging device 100 being in the charging environment, and the adapter not being overloaded. Furthermore, when the voltage at the node N1 is lower than the predetermined voltage, both of the adapter and the battery 200 are connected to the charging device 100, the signal of the battery 200 is normal and indicating that the battery 200 needs to be charged, and the adapter is not overloaded, the keyboard controller 130 forces the charging circuit 110 to stop producing the battery-charging power source VIN' at the node N1 to stop charging the battery 200.

In another embodiment of the invention, the keyboard controller 130 is further arranged to determine whether a charging current IB flowing to the battery 200 from the node N1 is less than a predetermined current value, wherein the charging current IB is produced by the charging power source VIN. In the present embodiment, the predetermined condition includes the voltage at the node N1 being lower than the predetermined voltage, and the charging current IB being less than the predetermined current value. Furthermore, the keyboard controller 130 is arranged to determine that the predetermined condition has been satisfied, when the voltage at the node N1 is lower than the predetermined voltage and the charging current IB is less than the predetermined current value. It should be noted that in one embodiment of the invention, the keyboard controller 130 is arranged to determine whether the charging current IB is less than the predetermined current value according to a determine signal S1 of a system management bus. In another embodiment of the invention, the keyboard controller 130 is arranged to determine whether the charging current IB is less than the predetermined current value according to the current flowing through a sensing resistor R1.

In another embodiment of the invention, the keyboard controller 130 is further arranged to determine whether the charging current IB flowing to the battery 200 from the node N1 is less than the predetermined current value, wherein the charging current IB is produced by the charging power source VIN. It should be noted that, in one embodiment of the invention, the keyboard controller 130 is arranged to determine whether the charging current IB is less than the predetermined current value according to a determine signal S1 of a system management bus. In another embodiment of the invention, the keyboard controller 130 is arranged to determine whether the charging current IB is less than the predetermined current value according to the current flowing through a sensing resistor R1. The keyboard controller 130 is arranged to determine whether the charging device 100 is in a charging environment and whether an adapter is overloaded, when the voltage at the node N1 is lower than the predetermined voltage and the charging current IB is less than the predetermined current value. For example, each of two connectors, which are used for connecting to the battery 200 and the adapter to the charging device 100, has a sensing device to transmit a sensing signal to the keyboard controller 130 when the adapter and/or the battery 200 are connected to the charging device 100, respectively. For example, the connectors can be plugs and/or sockets. Moreover, the keyboard controller 130 can determine whether the adapter and the battery 200 are connected to the charging device 100 according to whether the pins used for connecting to the adapter and the battery 200 have received the signal or not. Furthermore, a plurality of signal lines (not shown) are connected between the keyboard controller 130 and the battery 200, such as the signal line which is used for identifying the model of the battery 200, the rated voltage of the battery 200, and/or the temperature of the battery 200, etc. Therefore, the keyboard controller 130 can determine whether the signal of the battery 200 is normal according to the signals on the signal lines. In the present embodiment, the predetermined condition includes the voltage of the node N1 being lower than the predetermined voltage, the charging device 100 being in the charging environment, and the adapter not being overloaded. In the present embodiment, the predetermined condition includes the voltage of the node N1 being lower than the predetermined voltage, the charging current IB being less than the predetermined current value, the charging device 100 being in a charging environment, and the adapter not being overloaded. Furthermore, when the voltage of the node N1 is lower than the predetermined voltage, the charging current IB is less than the predetermined current value, the adapter and the battery 200 are both connected to the charging device 100, the signal of the battery 200 is normal and indicating that the battery 200 needs to be charged, and the adapter is not overloaded, the keyboard controller 130 determines that the predetermined condition has been satisfied.

In step S606, the keyboard controller 130 is arranged to force the charging circuit 110 to stop producing the battery-charging power source VIN' at the node N1, such that the battery 200 is stopped to be charged. The process ends at the step S606.

The charging system 1000 of the invention can determine whether a short circuit exists between the battery 200 and the charging device 100 according to the voltage at the node N1 and the other condition(s). The charging system 1000 of the invention is further arranged to stop charging the battery 200 to protect the charging system 1000 when short circuit exists between the battery 200 and the charging device 100.

The methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A charging device, comprising:
   a charging circuit, receiving a charging power source, and producing a battery-charging power source at a first node by the charging power source to charge a battery;
   a voltage detection circuit, detecting a voltage at the first node, and producing a voltage detection result; and
   a keyboard controller, determining whether the voltage at the first node is lower than a predetermined voltage according to the voltage detection result, and determining whether a predetermined condition has been satisfied, wherein the predetermined condition comprises the voltage at the first node being lower than the predetermined voltage, and the keyboard controller forces the charging circuit to stop producing the battery-charging power source at the first node when the predetermined condition has been satisfied;
   wherein the keyboard controller determines whether a charging current flowing to the battery from the first node is less than a predetermined current value when receiving the charging power source, wherein the charging current is produced by the charging power source, and the predetermined condition further comprises the charging current being less than the predetermined current value.

2. The charging device as claimed in claim 1, wherein the voltage detection circuit comprises:
   a zener diode, having a cathode coupled to the first node and an anode coupled to a second node;
   a first resistor, having a first terminal coupled to the second node and a second terminal coupled to a ground;
   a switching transistor, having a control terminal coupled to the second node, a drain terminal coupled to the keyboard controller and a source terminal coupled to the ground; and
   a second resistor, having a first terminal coupled to a voltage source and a second terminal coupled to the drain terminal of the switching transistor.

3. The charging device as claimed in claim 2, wherein the keyboard controller determines whether the voltage at the first node is lower than the predetermined voltage according to a signal at the drain terminal of the switching transistor.

4. The charging device as claimed in claim 1, wherein the voltage detection circuit comprises:
   a first resistor, having a first terminal coupled to a voltage source and a second terminal coupled to a second node;
   a second resistor, having a first terminal coupled to the second node and a second terminal coupled to a ground, wherein the first resistor and the second resistor divide the voltage source to produce the predetermined voltage at the second node; and
   a comparator, having a first input terminal coupled to the first node, a second input terminal coupled to the second node, and an output terminal producing a compare signal, wherein the compare signal is provided to the keyboard controller.

5. The charging device as claimed in claim 4, wherein the keyboard controller determines whether the voltage at the first node is lower than the predetermined voltage according to the compare signal.

6. The charging device as claimed in claim 1, wherein the keyboard controller determines whether the charging device is in a charging environment and whether an adapter used for providing the charging power source is overloaded, wherein the predetermined condition further comprises the charging device being in the charging environment and the adapter not being overloaded.

7. The charging device as claimed in claim 6, wherein the keyboard controller determines whether the charging device is in the charging environment according to whether the adapter and the battery are connected to the charging device, and determines whether the charging device is in the charging environment according to whether a signal of the battery is normal and indicates that the battery needs to be charged.

8. The charging device as claimed in claim 1, further comprising a system management bus coupled between the keyboard controller and the battery, wherein a determine signal of the system management bus corresponds to the charging current flowing through the battery, and the keyboard controller determines whether the charging current is less than the predetermined current value according to the determine signal.

9. The charging device as claimed in claim 1, further comprising a sensing resistor coupled between the first node and the battery, wherein the keyboard controller determines whether the charging current is less than the predetermined current value according to a current flowing through the sensing resistor.

10. The charging device as claimed in claim 1, wherein the keyboard controller determines whether the charging device is in a charging environment and whether an adapter is overloaded, wherein the predetermined condition further comprises the charging device being in the charging environment and the adapter not being overloaded.

11. The charging device as claimed in claim 10, wherein the keyboard controller determines whether the charging device is in the charging environment according to whether the adapter and the battery are connected to the charging device, and determine whether the charging device is in the charging environment according to whether a signal of the battery is normal and indicates that the battery needs to be charged.

12. A charging method, applied to a charging device used to charge a battery, comprising:
receiving a charging power source;
producing a battery-charging power source at a first node, by the charging power source, to charge the battery;
detecting a voltage at the first node when receiving the charging power source, and producing a voltage detection result accordingly;
determining whether the voltage at the first node is lower than a predetermined voltage according to the voltage detection result;
determining whether a charging current flowing to the battery from the first node is less than a predetermined current value when receiving the charging power source, wherein the charging current is produced by the charging power source, and a predetermined condition comprises the charging current being less than the predetermined current value;
determining whether the predetermined condition has been satisfied; and
forcing the charging circuit to stop producing the battery-charging power source at the first node when the predetermined condition has been satisfied, wherein the predetermined condition comprises the voltage of the first node being lower than a predetermined voltage.

13. The charging method as claimed in claim 12, further comprising determining whether the charging device is in a charging environment and whether an adapter used for providing the charging power source is overloaded, wherein the predetermined condition further comprises the charging device being in the charging environment and the adapter not being overloaded.

14. The charging method as claimed in claim 13, wherein step of determining whether the charging device is in the charging environment comprises:
determining whether the adapter and the battery are connected to the charging device; and
determining whether a signal of the battery is normal and indicates that the battery needs to be charged.

15. The charging method as claimed in claim 12, wherein step of determining whether the charging current is less than the predetermined current value comprises determining whether the charging current is less than the predetermined current value according to a determine signal of a system management bus.

16. The charging method as claimed in claim 12, wherein step of determining whether the charging current is less than the predetermined current value comprises determining whether the charging current is less than the predetermined current value according to a current flowing through a sensing resistor.

17. The charging method as claimed in claim 12, further comprising determining whether the charging device is in a charging environment and whether an adapter is overload when the voltage at the first node is lower than the predetermined voltage and the charging current is less than the predetermined current value, wherein the predetermined condition further comprises the charging device being in the charging environment and the adapter not being overloaded.

18. The charging method as claimed in claim 17, wherein step of determining whether the charging device is in the charging environment comprises:
determining whether the adapter and the battery are connected to the charging device; and
determining whether a signal of the battery is normal and indicates that the battery needs to be charged.

\* \* \* \* \*